United States Patent

Stiehler

[11] Patent Number: 5,568,214
[45] Date of Patent: Oct. 22, 1996

[54] TAKE-UP SPOOL CLUTCH WITH DELAYED ENGAGEMENT

[75] Inventor: Wayne E. Stiehler, Spencerport, N.Y.

[73] Assignee: Eastman Kodak Company, Rochester, N.Y.

[21] Appl. No.: 457,645

[22] Filed: Jun. 1, 1995

[51] Int. Cl.[6] .................................................. G03B 1/00
[52] U.S. Cl. ........................................ 396/411; 396/390
[58] Field of Search .............................................. 354/214

[56] References Cited

U.S. PATENT DOCUMENTS

| | | |
|---|---|---|
| 3,735,683 | 5/1973 | Umeda . |
| 4,318,603 | 3/1982 | Daitoku et al. . |
| 4,572,636 | 2/1986 | Konno ................................ 354/173.1 |
| 4,724,450 | 2/1988 | Miyawaki et al. . |
| 4,855,773 | 8/1989 | Harvey ............................... 354/173.1 |
| 5,061,950 | 10/1991 | Suzuki et al. ..................... 354/173.11 |
| 5,160,953 | 11/1992 | Iwashita et al. ................... 354/173.1 |
| 5,172,148 | 12/1992 | Ezawa ................................ 354/173.1 |
| 5,398,089 | 3/1995 | Stiehler .............................. 354/173.1 |
| 5,456,419 | 10/1995 | Ezawa . |

FOREIGN PATENT DOCUMENTS

| | | |
|---|---|---|
| 287864 | 2/1990 | Japan . |
| 2-90623 | 5/1990 | Japan . |

*Primary Examiner*—Monroe H. Hayes
*Attorney, Agent, or Firm*—Millen, White, Zelano & Branigan, P.C.; David A. Howley

[57] ABSTRACT

In a camera, a take-up spool clutch assembly (34) is provided with delayed engagement by disposing a clutch spring (32) between a take-up spool (10) and a drive gear (30). The clutch spring (32) engages a lug (46) on a hub portion (40) of the take-up spool (10) with a second end (64) to drive the take-up spool (10) in the take-up direction (36) when the drive gear (30) engages a first end (60) of the clutch spring (32). Before the take-up spool (10) can rotate in the take-up direction (36) after being rotated in the rewind direction (37), the drive gear (30) must complete substantially one revolution to re-engage the second end (64) of the clutch spring (32) into driving engagement with the lug (46). The time interval consumed by the single revolution of the drive gear spool (30) is sufficient to allow a planetary clutch (90) to disengage a rewind gear (97) and engage a thrust gear (96) with a supply spool (79).

10 Claims, 3 Drawing Sheets

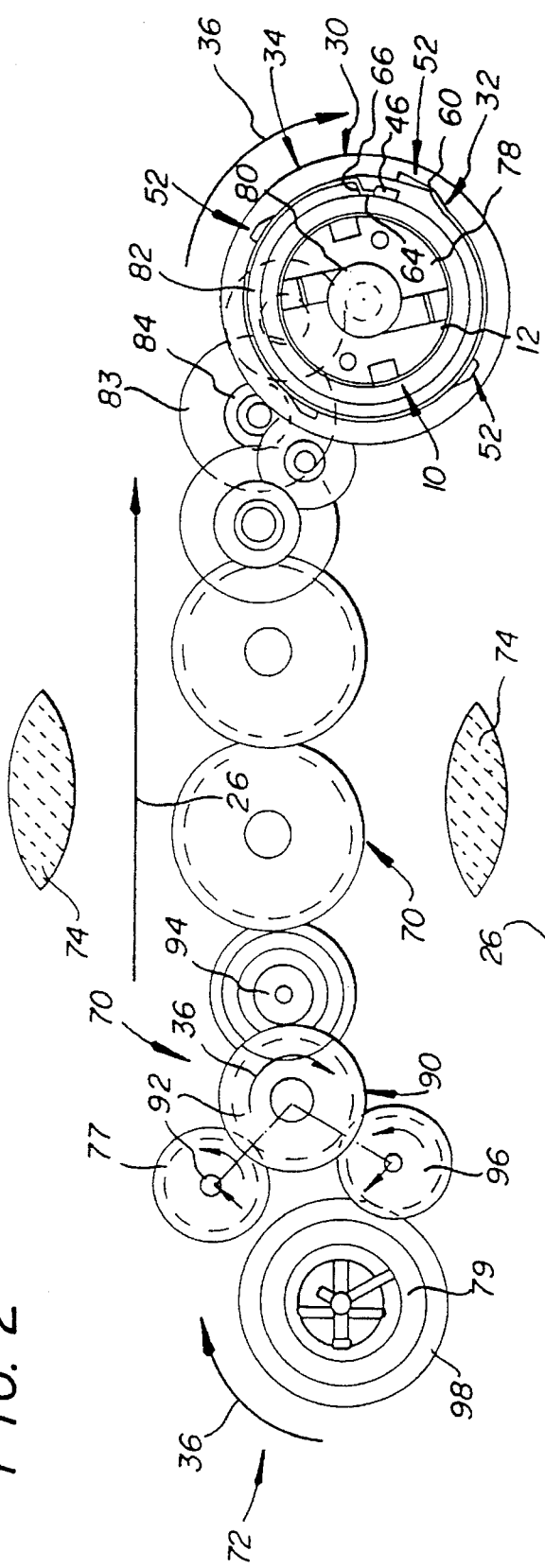

5,568,214

1

TAKE-UP SPOOL CLUTCH WITH DELAYED ENGAGEMENT

FIELD OF THE INVENTION

This invention relates to photography, and more particularly this invention relates to configuring motorized spool drive systems for operation in a mid-roll interrupt (MRI) mode.

BACKGROUND OF THE INVENTION

It is a desirable feature for cameras such as "Advanced Photographic System Cameras" (APS cameras) to have a MRI mode so that film cartridges may be removed from a camera with some frames exposed and other frames unexposed, and then later, reloaded to expose additional frames. By providing such a feature, customers may shoot a certain number of frames for a specific subject, rewind the film and then perhaps insert another film cartridge, and at a subsequent time reinsert the first cartridge. The customer, of course, wishes to take photographs with film remaining in the previously exposed cartridge and, therefore, must start with the first unexposed frame.

In APS cameras having magnetic read/write heads, the camera reads magnetic tracks on exposed film frames until it encounters the first available unexposed frame. The camera then performs a partial rewind of the film in order to pull the unexposed frame back past the beginning of the film gate. The camera then advances the unexposed frame through the film gate in a normal manner and registers the unexposed frame for the next photograph.

To perform this function in a small, low cost camera is difficult because the simple clutch arrangements inherent in low cost systems do not readily accommodate the MRI function. The MRI function usually utilizes planetary gear clutches, such as is disclosed in Japanese Kokai 2-87864, or ratchet type, over-running clutches such as is disclosed in U.S. Pat. No. 4,855,773, assigned to the assignee of the present invention. With these arrangements, the supply clutch is totally disengaged from its rewind function before the take-up clutch is allowed to engage, otherwise, gear train lock-up occurs. Accordingly, a delay action is required before the take-up clutch engages in order to ensure that the supply clutch is properly disengaged.

In more expensive systems, perhaps exemplified by U.S. Pat. No. 5,172,148, a second motor is utilized. With such a system, the MRI function is readily performed; however, employing of a second motor is expensive and, therefore, not a practical consideration for low cost cameras.

In view of the aforementioned considerations, there is a need for a low cost arrangement which would provide relatively inexpensive cameras with MRI capability so that, if the cameras are equipped with magnetic read-write heads, magnetic tracks on exposed films can be utilized to accomplish the MRI feature.

SUMMARY OF THE INVENTION

The present invention solves the above concerns by providing a take-up spool clutch with delayed engagement, thus providing sufficient time for a clutch connecting a supply spool to a drive train to be totally disengaged from its rewind function before the take-up spool clutch engages, thereby avoiding gear train lock-up.

2

According to the present invention, a take-up spool drive mechanism, useful for driving a take-up spool for accumulating film thereon in a photographic device is driven by a drive gear through a clutch. The clutch is disposed between the drive gear and the take-up spool and is constructed and arranged to engage only after the drive gear has substantially completed a single rotation in a take-up direction. The take-up direction is the rotational direction from a take-up mode in which film is accumulated on the take-up spool to a rewind mode in which film is returned from the take-up spool to the supply spool as the supply spool rotates in a rewind direction opposite the take-up direction.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 2 is a top view of a camera, with portions deleted, showing a gear train for driving a supply spool and the take-up spool of FIG. 1 in a film thrust/advance mode;

FIG. 3 is a view similar to FIG. 2 but showing the gear train and spools operating in a film rewinding mode.

DETAILED DESCRIPTION OF THE PREFERRED EMBODIMENT

Figure 1:
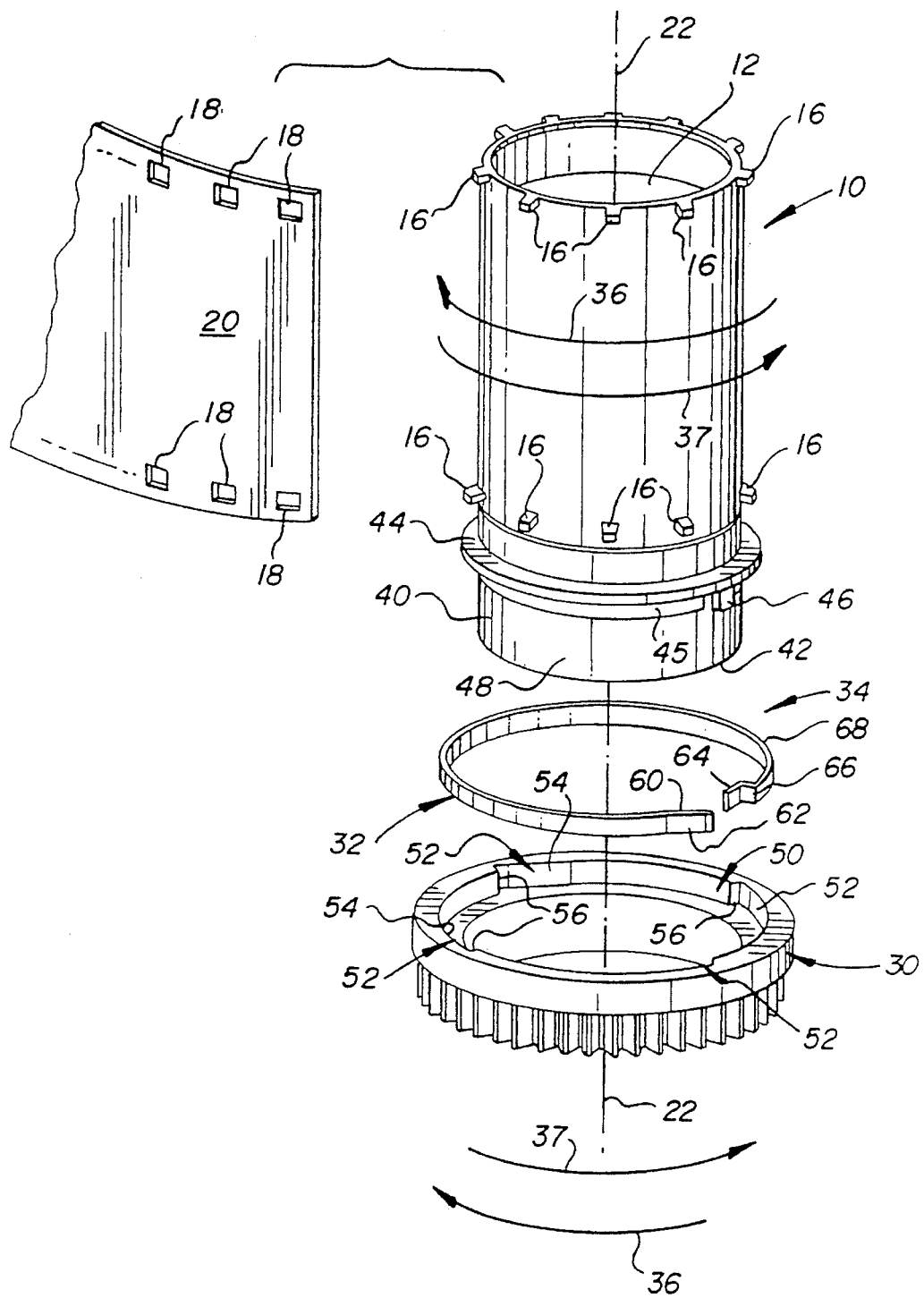
FIG. 1 is an exploded perspective view of a take-up spool configured with a delayed engagement clutch and drive gear configured in accordance with the principles of the present invention.

Take-Up Spool (FIG. 1)

Referring now to FIG. 1, numeral 10 generally indicates a take-up spool assembly for a motorized roll film camera. The details of the operation of a camera, such as exposure of film loaded into the camera body, are conventionally known and are not detailed further. The take-up spool 10 includes a hollow core 12 and an outer surface 14 with arrays of sprocket teeth 16 which engage sprocket holes 18 in a strip of film 20 to coil and uncoil the film when rotating about an axis 22. The take-up spool 10 is an integral component of a camera such as an aim-point-shoot, 35 mm still camera which, because of the features of the present invention, provides an inexpensive improvement facilitating adaptation of a mid-roll interrupt (MRI) mode when using film strips 20 having magnetic tracks indicating whether a particular frame is exposed or unexposed.

In accordance with the present invention, the take-up spool 10 cooperates with a drive gear 30 and a clutch member in the form of a clutch spring 32 to provide a take-up spool assembly 34. By utilizing the take-up spool assembly 34, the drive gear 30 transmits torque through the clutch spring 32 within 90° of rotation when rotating in the take-up direction illustrated by the arrow 36 for initially winding the film strip 20 thereon. When the film strip 20 is being rewound in direction of arrow 37, the take-up spool 10 free-wheels with respect to the drive gear 30 because the clutch spring 32 does not provide a condition of engagement between the take-up spool 10 and the gear 30.

If the mid-roll interrupt (MRI) mode is selected, the film strip 20 is still partially wound on the outer surface 14 of the take-up spool 10 and is caught thereon. In accordance with the principles of the present invention, the drive gear 30 completes substantially one revolution in the direction of arrow 36 before the clutch spring 32 positively couples the drive gear to the take-up spool 10. As will be explained further hereinafter, one revolution of the drive gear 30 provides sufficient time for a planetary gear clutch to disengage from a rewind gear and to engage a thrust gear driving a supply spool (see FIGS. 2–5).

Referring now more specifically to the structure of the clutch 34, the drive gear 30 is mounted on a hub 40 which is affixed to the take-up spool 10 so as to rotate both clockwise and counterclockwise therewith. The hub 40 has a free end 42 with a flange 44 thereon. Between the free end 42 and flange 44 there is a track 45 on which the clutch spring 32 rides and which includes a driving lug 46. If the hub 40 is not molded unitary with the take-up spool 10, then it is threadably fixed thereto.

The clutch spring 32 is held in position on the track 45 by an annular recess 50 in the drive gear 30. The annular recess 50 includes four ratchet stops 52 comprised of ramp portions 54 and radial shoulders 56, each of which face in the direction of take-up rotation 36.

The clutch spring 32 has a first end 60 mounted on a first spring arm portion 62 and a second end 64 mounted on a spring arm portion 66. The first end 60 is engaged by the radial shoulders 56 when the drive gear 30 is rotating in the direction of arrow 36 and the second end 64 engages the lug 46 to drive the take-up spool 10 to rotate in the direction of arrow 37.

When the drive gear 30 rotates in the film rewind direction 37, the first end 60 of the clutch spring 32 is not engaged by the radial shoulders 56 but rather allows the radial shoulders 56 to ratchet past the clutch spring. This also causes the clutch spring 32 to rotate substantially 360° until the back side 68 of the clutch spring 32 engages the lug 46 on the hub 40 holding the clutch spring in a fixed position with respect to the take-up spool 10 as the film strip 20 is pulled therefrom by the supply reel (see FIGS. 2–4). While the clutch spring 32 is held in position, the drive gear 30 continues to rotate in the direction of arrow 37 and to slip as the end 60 of the clutch spring ratchets past the ratchet stops 52.

Figure 4:
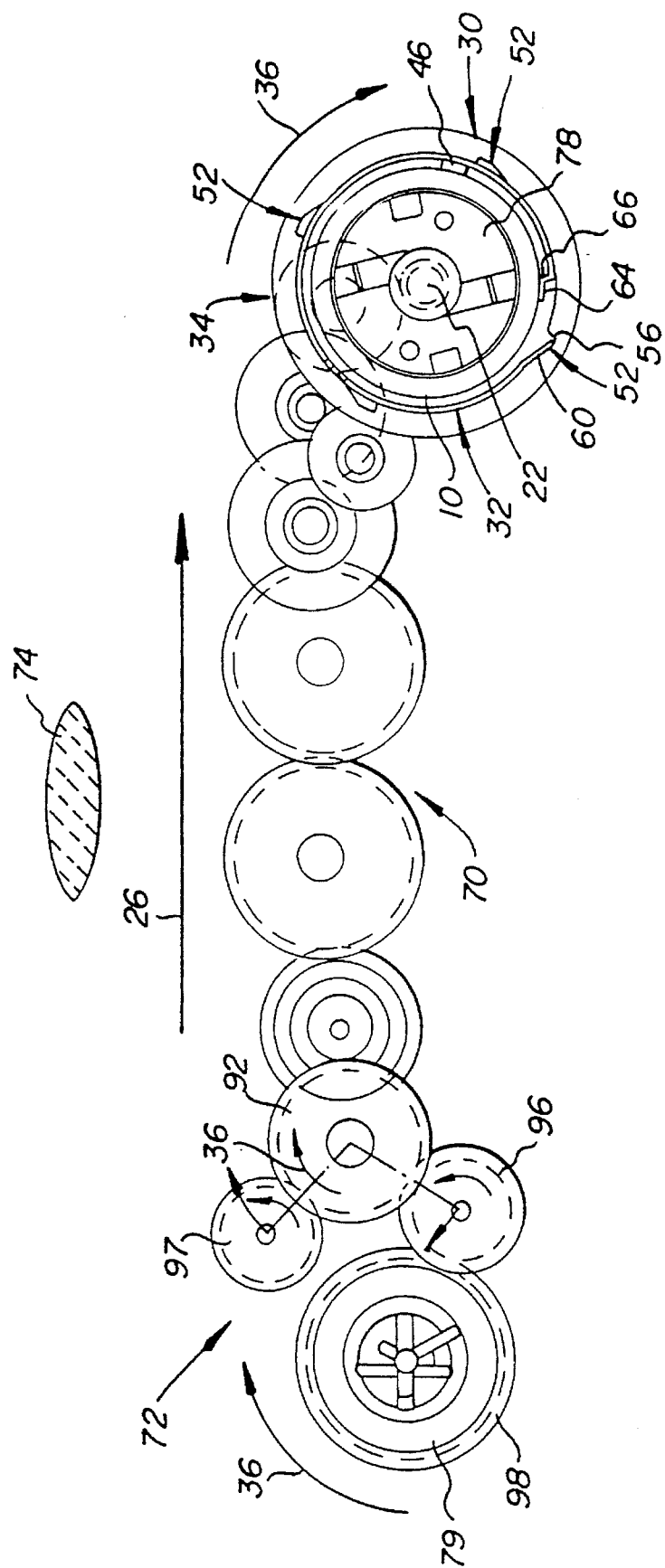
FIG. 4 is a view similar to FIGS. 2 and 3 showing the gear train operating in a film advance mode subsequent to operation in the film rewind mode of FIG. 3.

Operation of the Take-up Spool Clutch Assembly in an MRI Camera (FIGS. 2, 3 and 4)

Referring now to FIGS. 2, 3 and 4 which are to be considered in conjunction with FIG. 1, the take-up spool clutch assembly 34 is shown incorporated in a gear train 70 within a camera 72 to advance the film strip 20 so that the frames thereof are exposed to images through lens 74. It is seen that a single motor 78 drives both a supply spool 79 and the take-up spool 10 (also see FIG. 1). The motor 78 is a bidirectional motor and has an output gear 80 which drives a first gear 82 that in turn drives a second gear 83 which has an integral gear 84 thereon which meshes with the teeth of drive gear 30 (also see FIG. 1). Drive gear 30 is therefore driven in both the take-up direction 36 and the rewind direction 37 by the motor 78.

The integral gear 84 transmits torque across the camera 72 in a conventional manner through a gear train 70 to a planetary clutch 90. Planetary clutch 90 includes a sun gear 92 which is driven by a driving gear 94 in the gear train 70.

The sun gear 92 has meshed therewith a thrust gear 96 and a rewind gear 97. In FIG. 2, the thrust gear 96 drives the supply spool 72 through a cartridge drive gear 98. When the film 26 is being advanced in a film thrust mode wherein film is advanced from the supply spool 79, both the supply spool 79 and take-up spool 10 are rotated in the direction of arrow 36, with the supply spool being driven by thrust gear 96 and the take-up spool being driven by drive gear 30 which is in turn driven by gears 84, 82 and 80 geared to the motor 78. When in the film thrust mode, the drive gear 30 drives the take-up spool 10 as previously explained in FIG. 1 by engaging the end 60 of the clutch spring 32 with one of the radial shoulders 56. This causes the end 66 of the clutch spring 32 to engage the driving lug 46 on the spool so as to rotate the take-up spool 10 in the direction of arrow 36 about the axis 22.

If some of the frames of the film strip 26 have already been exposed, the film strip 26 advances until, in a conventional manner, magnetic detectors (not shown) detect the first unexposed frame. As is illustrated in FIG. 3, the motor 78 is then signaled to stop and reverse its direction of rotation to now rotate in the direction of arrow 37. When this happens, the drive gear 30 rotates in a direction to disengage the end 60 of the clutch spring 32 from the radial shoulder 56 so as not to drive the take-up spool 10 to allow the end 60 of the spring to ratchet over the stops 52 as the drive gear 30 rotates in the direction of arrow 37. The supply spool 79 rotates in the rewind direction 37 because it is driven by the gear train 70 and the planetary clutch 90 to rotate in the direction of arrow 37. During the film rewind mode of FIG. 3, the rewind gear 97 is meshed with the cartridge drive gear 98 rather than the thrust gear 96 being meshed with the cartridge drive gear. The rewind gear 97 is now meshed with cartridge drive gear 98 because the sun gear 92 is rotating in the direction of arrow 37 rather than the direction of arrow 36, as is the case in FIG. 2.

The film strip 26 rewinds from the take-up spool 10 back onto the supply spool 79 until the magnetic sensors (not shown) again detect a change from unexposed frames to exposed frames, at which time the motor 78 reverses direction to rotate the drive gear 30 and the sun gear 92 in the direction of arrow 36 (see FIG. 4). If the drive gear 30 immediately started rotation of the take-up spool 10 in the direction of arrow 36, the rewind gear 97 would be in engagement with the cartridge drive gear 98 resulting in a lock-up of the gears comprising the gear train 70. This would interrupt advancement of the film strip 26 and the camera 72 would malfunction. In accordance with the present invention, the drive gear 30 must complete substantially one revolution in the direction of arrow 36 before the drive gear causes the take-up spool 10 to begin rotation in the direction of arrow 36. During the interval of time required for one revolution of the drive gear 30, the motor 78 is driving the sun gear 92 through the gear train 70 to rotate in the direction of arrow 36 which disengages the rewind gear 97 and engages the thrust gear 96. Thus, rotation of the cartridge drive gear 98 and the supply spool 72 are started just before the take-up spool 10 starts to rotate.

As has been previously explained with reference to FIG. 1, when the drive gear 30 is rotating in the direction of arrow 36, the end 60 of clutch spring 32 1) is engaged by the next radial shoulder 56. This causes the clutch spring 32 to rotate from its FIG. 3 position with respect to the lug 46 to the FIG. 2 position with respect to the lug in which the end 64 of the clutch spring engages the lug to rotate the take-up spool 10. The take-up spool 10 then advances far enough to align the first unexposed frame on the film strip 26 with the lens 74 so that the unexposed frame may be exposed to the image transmitted by the lens. The supply spool 72 and take-up spool 10 then continue to index the film strip 26 in the conventional manner to expose successive frames.

By utilizing the take-up spool and clutch arrangement 34 which allows for delayed engagement between the output of the motor 78 and the take-up spool 10, an inexpensive and simple arrangement which is readily incorporated into existing designs for relatively inexpensive cameras is provided to allow the planetary clutch 90 to shift from the film rewind mode of FIG. 3 to the film advance mode of FIG. 2.

From the foregoing description, one skilled in the art can easily ascertain the essential characteristics of this invention, and without departing from the spirit and scope thereof, can make various changes and modifications of the invention to adapt it to various usages and conditions.

Parts List

10 Take-up spool
12 Hollow core
14 Outer surface
16 Sprocket teeth
18 Sprocket holes
20 Strip of film
22 Axis of spool
30 Drive gear
32 Clutch spring
34 Take-up spool assembly
36 Take-up arrow
37 Rewind arrow
40 Hub
42 Free end of hub
44 Flange
45 Track
46 Driving lug
48 Flats
50 Annular recess
52 Ratchet stops
54 Ramp portions
56 Radial shoulders
60 First end of clutch spring
64 Second end of clutch spring
66 First spring arm portion
68 Back side of clutch spring
70 Gear train
72 Camera
78 Bidirectional motor
79 Supply spool
80 Output gear
82 First gear
83 Second gear
84 Integral gear
90 Planetary clutch
92 Sun gear
94 Driving gear
96 Thrust gear
97 Rewind gear
98 Cartridge drive gear

What is claimed is:

1. In a take-up spool drive mechanism useful for driving a take-up spool for accumulating film thereon in a photographic device, wherein the take-up spool is driven by a drive gear, the improvement comprising:

a clutch disposed between the drive gear and the take-up spool, the clutch being constructed and arranged to engage only after the drive gear has substantially completed a single rotation in a take-up direction upon transitioning to a take-up mode, in which film is accumulated on the take-up spool, from a rewind mode in which film is returned from the take-up spool to a supply spool when the supply spool rotates in a rewind direction opposite the take-up direction.

2. The improvement of claim 1, wherein the drive gear is coaxial with the take-up spool, the take-up spool includes a driving lug and the drive gear includes at least one radial shoulder facing in the take-up direction; and wherein a clutch member is disposed between the drive gear and take-up spool for engagement by the driving shoulder on the driving gear to rotate the take-up spool in the take-up direction when the drive gear rotates in the take-up direction and to allow the drive gear to slip with respect to the take-up spool when rotated in the rewind direction.

3. The improvement of claim 2, wherein the spool includes a hub fixed thereto around which the drive gear is disposed and on which the driving lug is positioned.

4. The improvement of claim 3, wherein the drive gear is annular and wherein the radial shoulder is disposed on an inwardly facing surface of the drive gear with the clutch member disposed between hub and the inwardly facing surface in alignment with the radial shoulder and lug.

5. The improvement of claim 4, wherein the clutch member is configured as a circular spring having a first end for engagement by the radial shoulder on the drive gear and a second end for engaging the driving lug on the hub of the take-up spool.

6. In combination with a photographic camera having a supply spool and a take-up spool joined by a gear train driven by an electric motor, wherein the gear train is coupled to the supply spool by a planetary gear clutch having a thrust gear for driving the supply spool to dispense film and a rewind gear for driving the supply spool to rewind film;

a take-up spool drive mechanism for driving the take-up spool for accumulating the film thereon, the take-up spool being driven by a drive gear; and a clutch disposed between the drive gear and the take-up spool, the clutch being constructed and arranged to engage only after the drive gear has substantially completed a single revolution in a take-up direction from a take-up mode in which film is accumulated on the take-up spool to a rewind mode in which film is returned from the take-up spool to a supply spool when the supply spool rotates in a rewind direction opposite the take-up direction.

7. The combination of claim 6, wherein the drive gear is coaxial with the take-up spool, the take-up spool includes a driving lug and the drive gear includes at least one radial shoulder facing in the take-up direction; and wherein a clutch member is disposed between the drive gear and take-up spool for engagement by the driving shoulder on the driving gear to rotate the take-up spool in the take-up direction when the drive gear rotates in the take-up direction and to allow the drive gear to slip with respect to the take-up spool when rotated in the rewind direction.

8. The combination of claim 7, wherein the spool includes a hub fixed thereto around which the drive gear is disposed and on which the driving lug is positioned.

9. The combination of claim 8, wherein the drive gear is annular and wherein the radial shoulder is disposed on an inwardly facing surface of the drive gear with the clutch member disposed between hub and the inwardly facing surface in alignment with the radial shoulder and lug.

10. The combination of claim 9, wherein the clutch member is configured as a circular spring having a first end for engagement by the radial shoulder on the drive gear and a second end for engaging the driving lug on the hub of the take-up spool.

* * * * *